United States Patent
Tsang et al.

(10) Patent No.: US 9,292,129 B2
(45) Date of Patent: Mar. 22, 2016

(54) INTERACTIVE INPUT SYSTEM AND METHOD THEREFOR

(71) Applicant: SMART Technologies ULC, Calgary (CA)

(72) Inventors: Kenny Tsang, Calgary (CA); Dinesh Advani, Calgary (CA); Daniel Zhang, Calgary (CA)

(73) Assignee: SMART Technologies ULC, Calgary (CA)

( * ) Notice: Subject to any disclaimer, the term of this patent is extended or adjusted under 35 U.S.C. 154(b) by 28 days.

(21) Appl. No.: 14/067,113

(22) Filed: Oct. 30, 2013

(65) Prior Publication Data
US 2014/0118284 A1    May 1, 2014

Related U.S. Application Data

(60) Provisional application No. 61/720,331, filed on Oct. 30, 2012.

(51) Int. Cl.
*G06F 3/041* (2006.01)
*G06F 17/24* (2006.01)
*G06F 3/042* (2006.01)

(52) U.S. Cl.
CPC ............ *G06F 3/0418* (2013.01); *G06F 3/0425* (2013.01); *G06F 17/242* (2013.01); *G06F 2203/0381* (2013.01)

(58) Field of Classification Search
CPC .............................. G06F 3/0418; G06F 3/0425
See application file for complete search history.

(56) References Cited

U.S. PATENT DOCUMENTS

| | | |
|---|---|---|
| 5,448,263 A | 9/1995 | Martin |
| 6,141,000 A | 10/2000 | Martin |
| 6,337,681 B1 | 1/2002 | Martin |
| 6,747,636 B2 | 6/2004 | Martin |
| 6,803,906 B1 | 10/2004 | Morrison et al. |
| 7,232,986 B2 | 6/2007 | Worthington et al. |
| 7,236,162 B2 | 6/2007 | Morrison et al. |
| 7,274,356 B2 | 9/2007 | Ung et al. |
| 7,532,206 B2 | 5/2009 | Morrison et al. |
| 2001/0032057 A1* | 10/2001 | Smith et al. ............. 702/94 |
| 2004/0179001 A1 | 9/2004 | Morrison et al. |
| 2006/0154227 A1* | 7/2006 | Rossi et al. ............. 434/350 |
| 2011/0025650 A1* | 2/2011 | Joscelyne ............. 345/178 |
| 2011/0069019 A1 | 3/2011 | Carpendale et al. |

(Continued)

*Primary Examiner* — Latanya Bibbins
(74) *Attorney, Agent, or Firm* — Katten Muchin Rosenman LLP (57) ABSTRACT

A method for determining the location of a touch input in an application window on an interactive surface of a display device is described. The application window comprises a canvas configured to display at least a portion of a user interface. The method comprises the following steps. A first location of the touch input associated with a first coordinate space is determined. The first coordinate space is associated with the interactive surface. The touch input is used to emulate a mouse event. A second location of the touch input associated with a second coordinate space is determined in response to the emulated mouse event. The second coordinate space is associated with the user interface. At least one offset parameter is calculated, correlating the first coordinate space with the second coordinate space. While the first coordinate space does not change with respect the second coordinate space, the at least one offset parameter is used to determine the location of subsequent touch inputs based on corresponding locations associated with the first coordinate space. A computer readable medium and an interactive input system for implementing the method are also described.

33 Claims, 5 Drawing Sheets

(56) References Cited

U.S. PATENT DOCUMENTS

| | | |
|---|---|---|
| 2011/0169736 A1 | 7/2011 | Bolt et al. |
| 2011/0242060 A1* | 10/2011 | McGibney et al. ........... 345/179 |
| 2011/0276876 A1* | 11/2011 | Kwan et al. ................... 715/256 |
| 2014/0040767 A1* | 2/2014 | Bolia ............................ 715/751 |
| 2014/0068419 A1* | 3/2014 | Bourke et al. ................ 715/235 |

* cited by examiner

INTERACTIVE INPUT SYSTEM AND METHOD THEREFOR

The subject application relates generally to an interactive input system, and in particular, to a system and method for injecting pointer input into an application window. This application claims priority from U.S. Provisional Application No. 61/720,331, titled "An Interactive Input System and Method Therefor", filed Oct. 30, 2012.

BACKGROUND OF THE INVENTION

Interactive input systems that allow users to inject input such as for example digital ink, mouse events etc. into an application program using an active pointer (e.g. a pointer that emits light, sound or other signal), a passive pointer (e.g., a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies ULC of Calgary, Alberta, Canada, assignee of the subject application, the entire disclosure of which are incorporated herein by reference; touch systems comprising touch panels employing electromagnetic, capacitive, acoustic or other technologies to register pointer input; tablet and laptop personal computers (PCs); personal digital assistants (PDAs) and other handheld devices; and other similar devices.

Although efforts have been made to make software applications more user-friendly, it is still desirable to improve user experience of software applications used in interactive input systems. It is therefore an object to provide a novel method for for manipulating a graphical user interface in an interactive input system.

SUMMARY OF THE INVENTION

In accordance with one aspect of the present invention there is provided a method for determining the location of a touch input in an application window on an interactive surface of a display device, the application window comprising a canvas configured to display at least a portion of a user interface; the method comprising: determining a first location of the touch input associated with a first coordinate space, the first coordinate space being associated with the interactive surface; using the touch input to emulate a mouse event; determining a second location of the touch input associated with a second coordinate space in response to the emulated mouse event; the second coordinate space being associated with the user interface; calculating at least one offset parameter correlating the first coordinate space with the second coordinate space; and while the first coordinate space does not change with respect the second coordinate space, using the at least one offset parameter to determine the location of subsequent touch inputs based on corresponding locations associated with the first coordinate space.

In accordance with further aspects of the invention, there are provided a computer readable medium and an interactive input system for implementing the method described above.

BRIEF DESCRIPTION OF THE DRAWINGS

An embodiment of the invention will now be described by way of example only with reference to the following drawings in which.

DETAILED DESCRIPTION OF THE PREFERRED EMBODIMENTS

Figure 1:
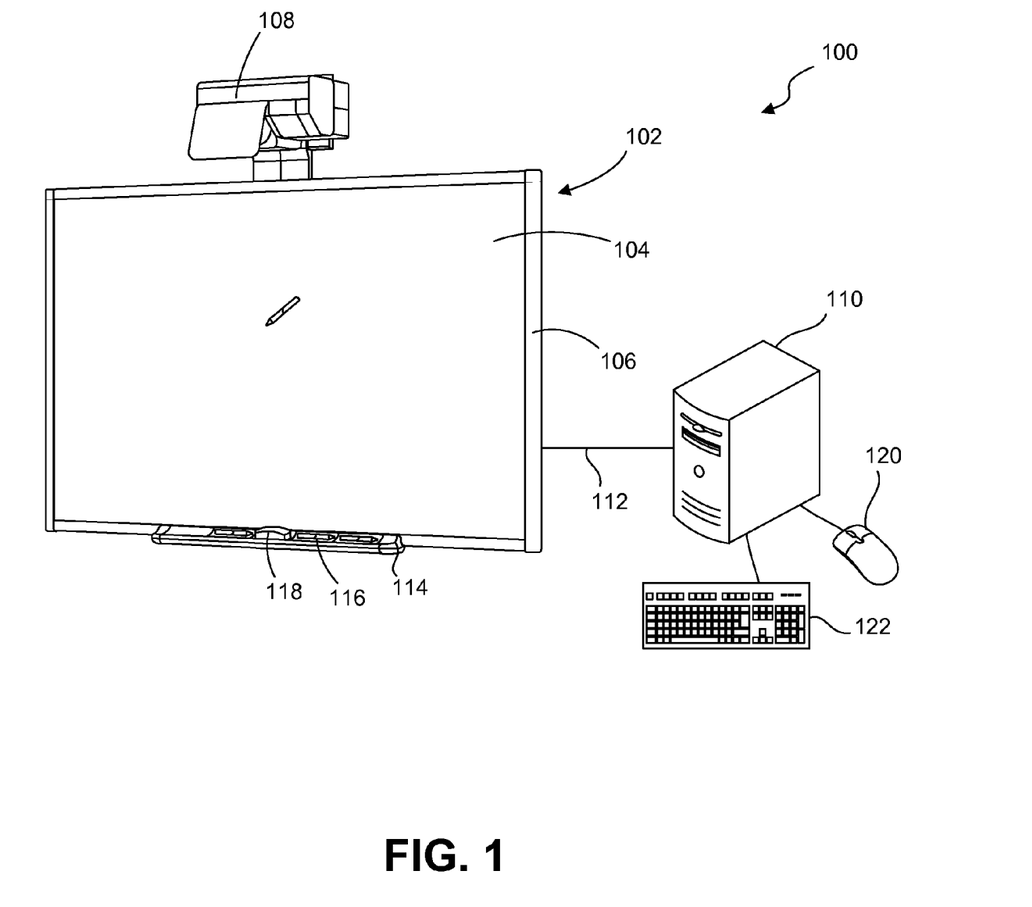
FIG. 1 is a perspective view of an interactive input system.

For convenience, like numerals in the description refer to like structures in the drawings. Referring to FIG. 1, an interactive input system is shown and is generally identified by reference numeral 100. Interactive input system 100 allows one or more users to inject input such as digital ink, mouse events, commands, and the like into an executing application program. In this embodiment, interactive input system 100 comprises an interactive display device 102 in the form of an interactive whiteboard (IWB) mounted on a vertical support surface such as a wall surface, for example, or the like. IWB 102 comprises a generally planar, rectangular interactive surface 104 that is surrounded about its periphery by a bezel 106. A projector 108 is mounted on a support surface above the IWB 102 and projects an image, such as a computer desktop for example, onto the interactive surface 104. In this embodiment, the projector 108 is an ultra-short-throw projector such as that sold by SMART Technologies ULC of Calgary, Alberta, Canada, assignee of the subject application, under the name "SMART UX60".

The IWB 102 employs machine vision to detect one or more pointers brought into a region of interest in proximity with the interactive surface 104. The IWB 102 communicates with a general purpose computing device 110, executing one or more application programs, via a suitable wired or wireless communication link 112. In this embodiment, the communication link 112 is a universal serial bus (USB) cable. The general purpose computing device 110 processes output from the IWB 102 and adjusts image data that is output to the projector 108, if required, so that the image presented on the interactive surface 104 reflects pointer activity. In this manner, the IWB 102, general purpose computing device 110 and projector 108 allow pointer activity proximate to the interactive surface 104 to be recorded as writing or drawing or used to control execution of one or more application programs executed by the general purpose computing device 110.

The bezel 106 is mechanically fastened to the interactive surface 104 and comprises four bezel segments that extend along the edges of the interactive surface 104. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 104.

A tool tray 114 is affixed to the IWB 102 adjacent the bottom bezel segment using suitable fasteners such as for example, screws, clips, adhesive etc. As can be seen, the tool tray 114 comprises a housing having an upper surface configured to define a plurality of receptacles or slots. The receptacles are sized to receive one or more pen tools 116 as well as an eraser tool 118 that can be used to interact with the interactive surface 104. Control buttons (not shown) are also provided on the upper surface of the tool tray housing to enable a user to control operation of the interactive input system 100. Further specifies of the tool tray 114 are described in U.S. Patent Application Publication No. 2011/0169736 to Bolt et al., filed on Feb. 19, 2010, and entitled "INTERACTIVE INPUT SYSTEM AND TOOL TRAY THEREFOR", the content of which is incorporated herein by reference in its entirety.

Imaging assemblies (not shown) are accommodated by the bezel 106, with each imaging assembly being positioned adjacent a different corner of the bezel. Each of the imaging assemblies comprises an image sensor and associated lens assembly that provides the image sensor with a field of view sufficiently large as to encompass the entire interactive surface 104. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the interactive surface 104 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes reflected IR illumination and appears as a dark region interrupting the bright band in captured image frames.

The imaging assemblies are oriented so that their fields of view overlap and look generally across the entire interactive surface 104. In this manner, any pointer such as for example a user's finger, a cylinder or other suitable object, a pen tool 116 or an eraser tool 118 lifted from a receptacle of the tool tray 114, that is brought into proximity of the interactive surface 104 appears in the fields of view of the imaging assemblies and thus, is captured in image frames acquired by multiple imaging assemblies. When the imaging assemblies acquire image frames in which a pointer exists, the imaging assemblies convey pointer data to the general purpose computing device 110.

The general purpose computing device 110 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computer components to the processing unit. The general purpose computing device 110 may also comprise networking capabilities using Ethernet, WiFi, and/or other suitable network format, to enable connection to shared or remote drives, one or more networked computers, or other networked devices. A mouse 120 and a keyboard 122 are coupled to the general purpose computing device 110.

The general purpose computing device 110 processes pointer data received from the imaging assemblies to resolve pointer ambiguity by combining the pointer data detected by the imaging assemblies, and to compute the locations of pointers proximate the interactive surface 104 (sometimes referred to as "pointer contacts") using well-known triangulation. The computed pointer locations are then recorded as writing or drawing or used as an input command to control execution of an application program as described above.

In addition to computing the locations of pointers proximate to the interactive surface 104, the general purpose computing device 110 also determines the pointer types (e.g., pen tool, finger or palm) by using pointer type data received from the IWB 102. Here, the pointer type data is generated for each pointer contact by at least one of the imaging assembly DSPs by differentiating a curve of growth derived from a horizontal intensity profile of pixels corresponding to each pointer tip in captured image frames. Specifics of methods used to determine pointer type are disclosed in U.S. Pat. No. 7,532,206 to Morrison, et al., and assigned to SMART Technologies ULC, the disclosure of which is incorporated herein by reference in its entirety.

Figure 2:
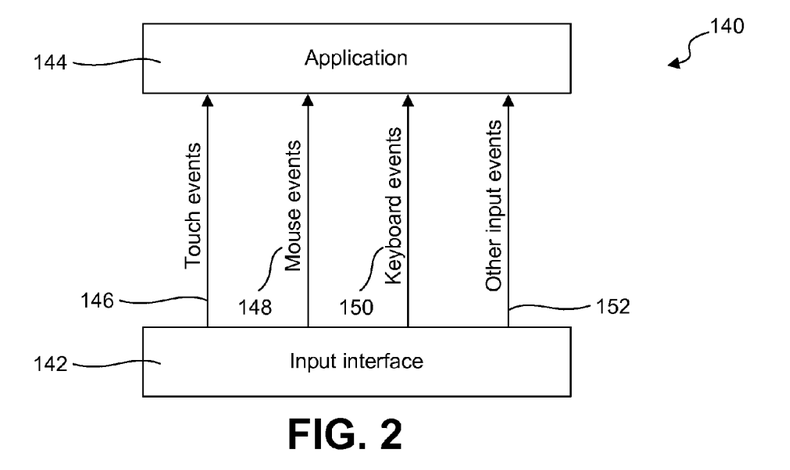
FIG. 2 illustrates exemplary software architecture used by the interactive input system of FIG. 1.

A software program running in the computing device 110 presents, via the projector 108, an image representing a graphic user interface on the interactive surface 104. The software program processes touch input generated from the interactive surface 104, and adjusts the image on the interactive surface to allow users to manipulate the graphic user interface. Referring to FIG. 2 an exemplary software architecture used by the interactive input system 100 is shown and is generally identified by reference numeral 140. The software architecture 140 comprises an input interface layer 142 and an application layer 144 comprising one or more application programs. The input interface layer 142 is configured to receive input from various input sources generated from the input devices of the interactive input system 100. The input devices include the IWB 102, the mouse 120, the keyboard 122, and other input devices, depending on the implementation. The input interface layer 142 processes received input and generates input events, such as touch events 146, mouse events 148, keyboard events 150 and/or other input events 152. The generated input events are then transmitted to the application layer 144 for processing.

As one or more pointers contact the interactive surface 104 of the IWB 102, associated touch events are generated. The touch events are generated from the time the one or more pointers are brought into contact with the interactive surface 104 (referred to as a contact down event) until the time the one or more pointers are lifted from the interactive surface 104 (referred to as a contact up event). As will be appreciated, a contact down event is similar to a mouse down event in a typical graphical user interface utilizing mouse input, wherein a user presses the left mouse button. Similarly, a contact up event is similar to a mouse up event in a typical graphical user interface utilizing mouse input, wherein a user releases the pressed mouse button. A contact move event is generated when a pointer is contacting and moving on the interactive surface 104, and is similar to a mouse drag event in a typical graphical user interface utilizing mouse input, wherein a user moves the mouse while pressing and holding the left mouse button.

In this embodiment, one of the applications in the application layer 144 is a web browser such as Google Chrome, Mozilla Firefox, Internet Explorer or the like. As is known, a web browser accepts a Universal Resource Identifier (URI) as input. The URI is an identifier, such as an address of a website for example, that identifies the location of a webpage. The web browser accesses the webpage identified by the URI, retrieves data, and displays the retrieved webpage in a browser window.

Figure 3:
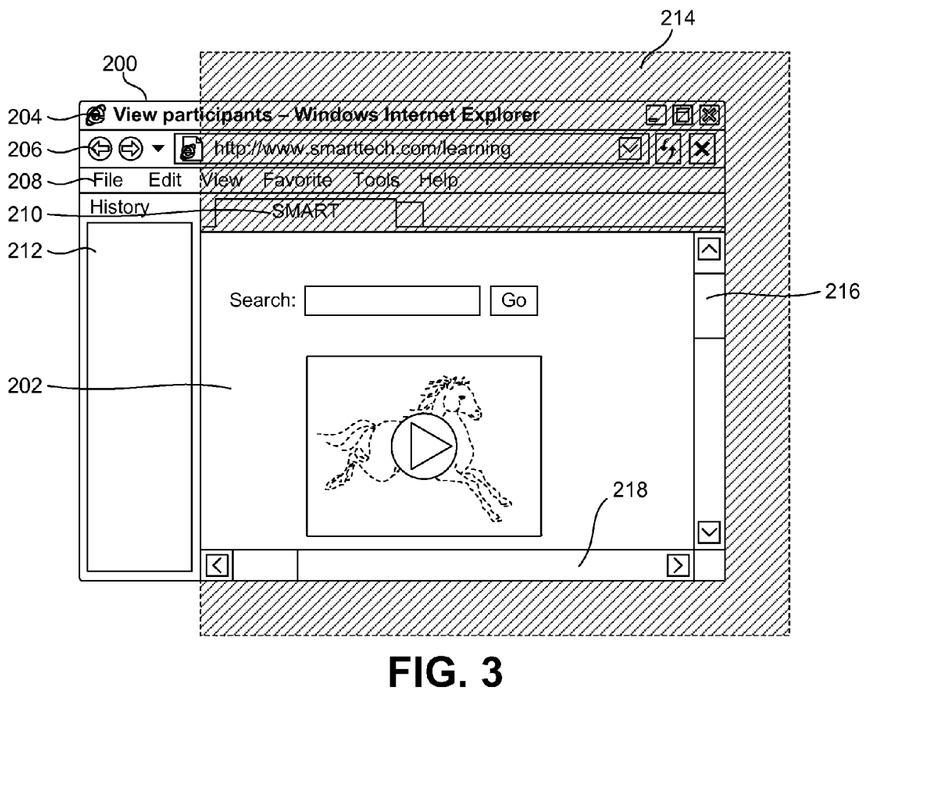
FIG. 3 illustrates an exemplary application window of a web browser.

Referring to FIG. 3 an exemplary application window of a web browser is shown and generally identified by numeral 200. The application window 200 comprises a canvas 202 and a plurality of other window components such as a title bar 204, a toolbar 206, a menu bar 208, one or more webpage tabs 210 and a sidebar 212, for example. The web browser loads a webpage 214 to be displayed on the canvas 202. If the size of the webpage 214 is larger than that of the canvas 202, only a portion of the webpage 214 is displayed on the canvas 202 at a given time. A vertical scrollbar 216 and/or a horizontal scrollbar 218 are provided to facilitate panning the webpage 214 so that different portions can be displayed on the canvas 202, as desired.

The web browser also provides an application program interface (API) to allow one or more extension modules, referred to as addons or plug-ins, to be installed. The addons/plug-ins provides the ability to expand the functionality of the web browser. In this embodiment, the web browser includes a touch input addon to provide touch functionality to the web browser. The touch input addon is configured to inject touch script code, such as JavaScript code for example, into the webpage 114 as it is loaded by the web browser. The touch script code is configured to provide functionality to the web browser so that touch input can be injected into the webpage displayed in the application window 200, as will be described below.

Figure 4:
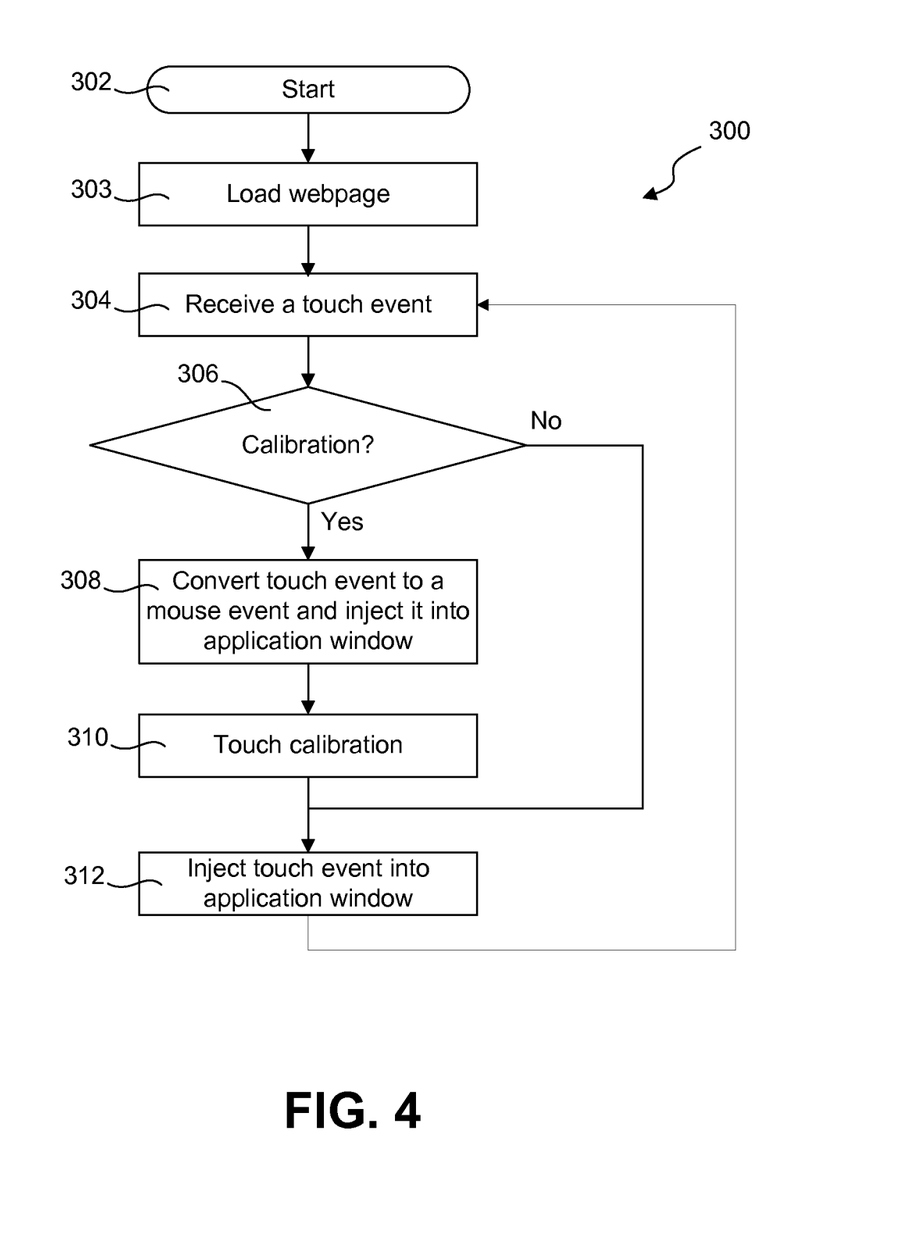
FIG. 4 illustrates a flowchart showing steps for injecting touch input events into a webpage displayed in the web browser.

Referring to FIG. 4 a flowchart showing steps for injecting touch input events into the webpage 214 displayed in the application window 200 is shown and generally illustrated by numeral 300. At step 302, the web browser is launched. At step 303, the webpage 214 is loaded. As part of loading the webpage 214, the touch input addon injects the touch script code into webpage. The touch script code is configured to direct the web browser to communicate with the input interface layer 142 and receive notification of touch events while the webpage 214 is loaded. At step 304, a notification of a touch event is received. A touch event is considered to be a touch input received on the canvas 202. Any touch input received outside of the canvas 202 is treated as is standard in the art, for example as a mouse click.

At step 306, in response to the touch event, the touch script code determines whether or not to perform touch calibration. In this embodiment, touch calibration is performed when a position of the webpage 214 on the canvas 202 changes. For example, touch calibration is performed when the webpage 214 is loaded into the web browser, when the application window 200 is moved to another location, when the application window 200 is resized, when components of the application window 200 (for example the sidebar 214, toolbar 206, menu bar 208 and the like) are changed so that the size and/or position of the canvas 202 is changed, or when the webpage 214 displayed on the canvas 202 is panned to a different portion.

If it is determined that touch calibration is required, then at step 308 the touch script code converts the received touch event into a mouse event and injects the mouse event into the application window 200. As is known in the art, in response to a mouse event, the web browser determines a location of the mouse within a reference frame of the webpage 214. At step 310, touch calibration is performed using calibration parameters provided by the web browser and the mouse location determined in step 308 to determine offset parameters. Details of the touch calibration 310 will be described with reference to FIG. 5. Then, at step 312, the touch event is injected into the application window 200. This is achieved by applying the offset parameters to the identified pointer location of the touch event to determine a location of the touch event within the reference frame of the webpage 214.

If it is determined that touch calibration is not required, the touch input addon continues at step 312 and the touch event is injected into the browser application window 200.

Figure 5:
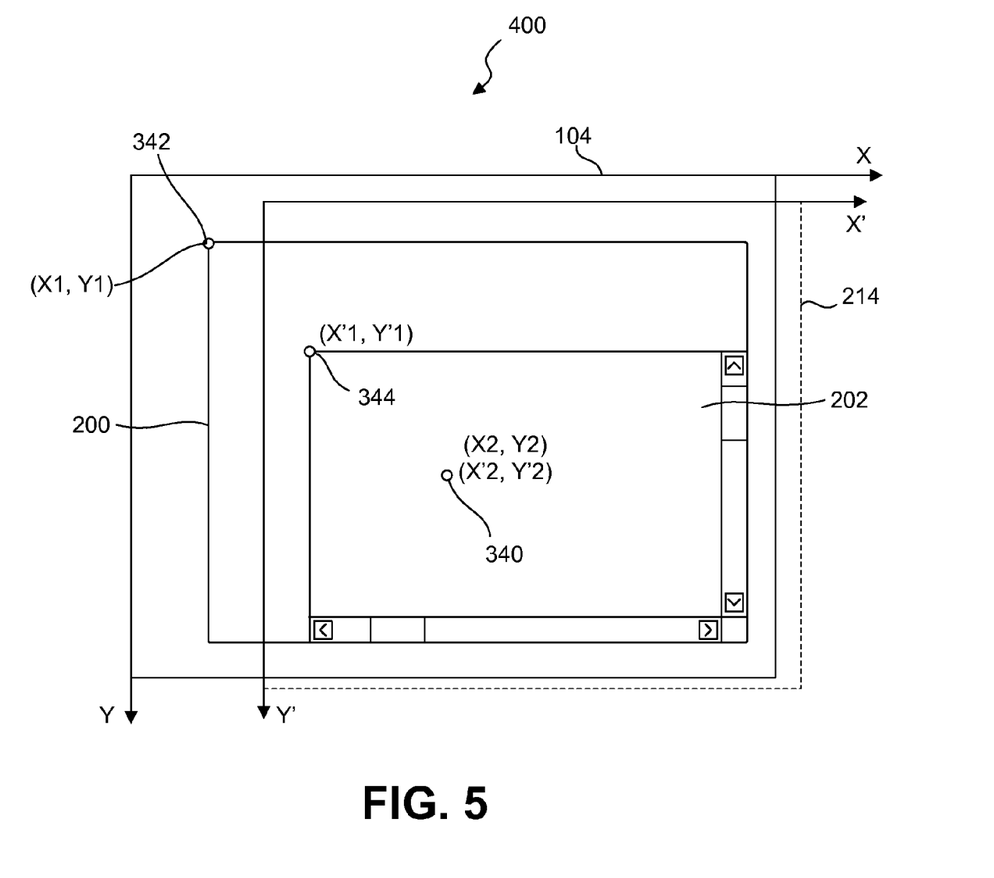
FIG. 5 illustrates calibration parameters of the application window of FIG. 3 for performing the touch calibration.

Referring to FIG. 5, calibration parameters of the application window 200 for performing the touch calibration are shown and generally illustrated by numeral 400. For ease of illustration, some window components, such as the title bar 204, toolbar 206 and menu bar 208 of the application window 200 are not shown. As previously described, the application window 200 is displayed on the interactive surface 104. The application window 200 displays the webpage 214, or a portion of the webpage 214, on the canvas 202.

A screen coordinate system (X-Y) is defined for the IWB. In this embodiment, the origin of the screen coordinate system is located at an upper-left corner of the interactive surface 104. The X-axis of the screen coordinate system increases towards the right. The Y-axis of the screen coordinate system increases downwardly. It is assumed that the IWB 102 has been calibrated as is known in the art, so that any touch input on the interactive surface 104 will be properly mapped to a location of the display image output from the computing device 110 in the screen coordinate system.

A webpage coordinate system (X'-Y') is defined for the webpage 214. In this embodiment, the origin of the webpage coordinate system is located at an upper-left corner of the webpage 214. The X-axis of the webpage coordinate system increases towards the right. The Y-axis of the webpage coordinate system increases downwardly. As will be appreciated, the webpage coordinate system may move with respect to the screen coordinate system when the webpage 214 is loaded, changed or panned, which is why the touch calibration is performed.

The touch script code retrieves a variety of information about the application window 200 from the web browser, including an application window location and a webpage offset. The application window location refers to a location of the application window on the interactive surface 104 and is represented by an upper-left corner 342 of the application window. Accordingly, the application window location 342 in the screen coordinate system is at location (X1, Y1). The webpage offset refers to an offset between the origin of the webpage coordinate system and a point of the webpage displayed in an upper left corner 344 of the canvas 202. Accordingly, the webpage offset in the webpage coordinate system is at location (X'1, Y'1).

When a touch event is received at step 304, the input interface layer 142 reports the location (X2, Y2) of the touch event in the screen coordinate system. If calibration is to be performed then at step 308 the touch event is converted to a mouse event and injected into the application window. In response, the web browser reports the location (X'2, Y'2) of the mouse event in the webpage coordinate system. At step 310 the touch calibration is performed by calculating the offset parameters. Specifically, in this embodiment a horizontal offset xOffset and a vertical offset yOffset are calculated as follows:

(xOffset, yOffset)=(mouse event location in screen coordinate system)−(window position in screen coordinate system)−(mouse event location in webpage coordinate system)+(webpage offset);

or, using the locations described above:

xOffset=X2−X1−X'2+X'1, yOffset=Y2−Y1−Y'2+Y'1.

When injecting touch event into application window at step 312, the calculated offset parameters (xOffset, yOffset) are used for determining the touch event location in the webpage coordinate system as:

(touch event location in webpage coordinate system)= (mouse event in screen coordinate system)−(window position in screen coordinate system)−(xOffset, yOffset)+(webpage offset).

Thus it will be appreciated that the mouse event is used to facilitate determining the offset parameters. Once the offset parameters have been determined, they can be applied to the touch event location without necessitating a mouse event to in order to determine the touch event location in the webpage coordinate system. This allows web browsers, as well as other applications, that are not specifically developed for use with interactive display devices 102 to be used seamlessly therewith.

Further, in addition to location, the touch event injected into the application window 200 may comprise a plurality of other parameters, such as a pointer type (pen tool or a finger for example), the colour of the pen tool, and the like. The parameters could not be conveyed by emulating a mouse event. The touch script code responds to received touch events based, at least in part, on the parameters of the touch events. For example, if the touch script code determines from the pointer type parameter of the touch event that a finger is touching the application window, the touch script code can process the touch event as for injecting user commands, such as panning the webpage, selecting text or images, clicking a link, and the like. As another example, if the touch script code determines from the pointer type parameter of the touch event that a pen tool is touching the application window, the touch script code can process the touch event as injecting digital ink to allow a user to write digital ink on the webpage 214 or into a text input area as text.

Figure 6:
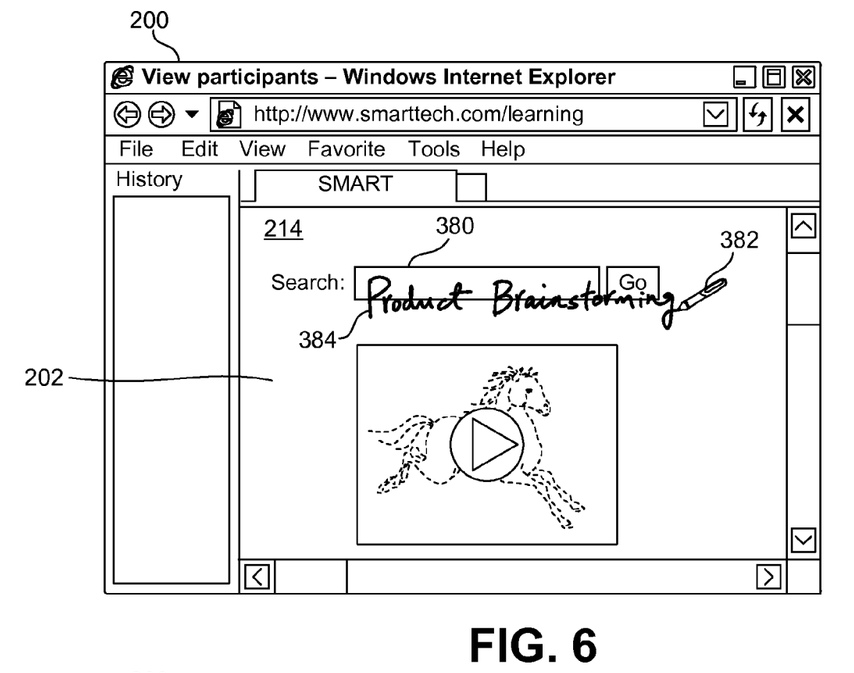
FIG. 6 is an exemplary application window with digital ink applied over a text input area.
Figure 7:
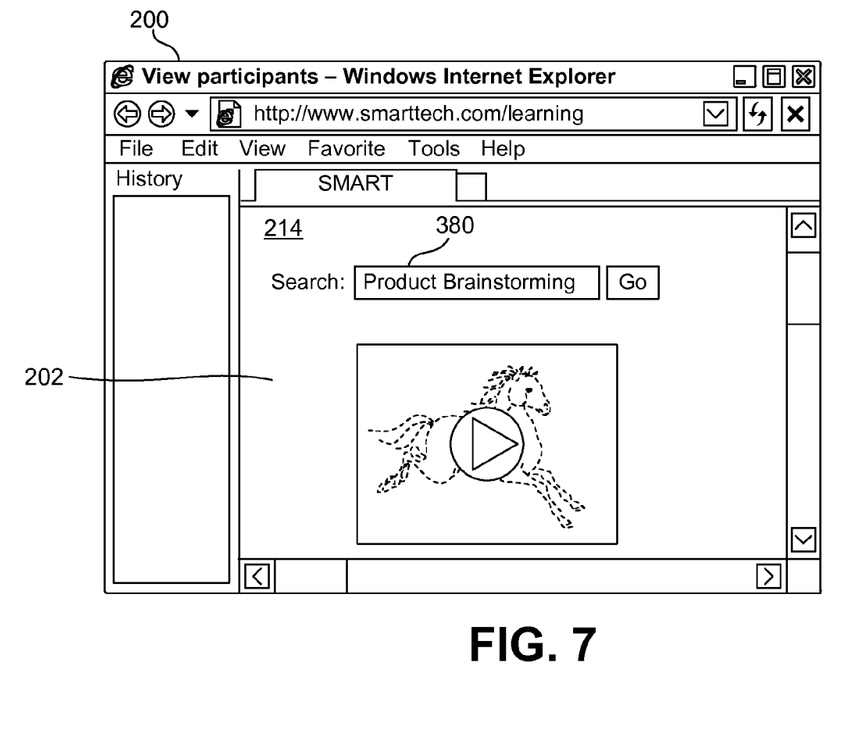
FIGS. 7 is the application window of FIG. 6 in which the digital ink has been converted to text and added to the text input area.

Referring to FIGS. 6 and 7, an exemplary application window 200 is shown. The application window 200 includes a webpage 214 having a text input area 380. A user (not shown) uses a pen tool 382 to hand-write digital ink 384 in the canvas 202 of the application window 200. The web browser, with the assistance of the touch script code, calibrates the touch input as described above when the first touch event is received. The touch script code then determines from the calibrated touch events that a pen tool is used for injecting the digital ink 384. The touch script code also calculates the position of the digital ink 384 in the webpage coordinate system as described above. Based on the calculated position, it is determined that the injected digital ink overlaps the text input area 380. The digital ink is completed when the user lifts the pen tool 382 from the interactive surface 104. After a predetermined time threshold has passed, the touch script code converts the injected digital ink 384 into text, injects the converted text into the text input area 380, as shown in FIG. 7, and removes the digital ink from the interactive surface 104.

In this embodiment, the digital ink 384 is converted from hand-writing to text using a suitable one of a plurality of known text recognition mechanisms. The code and/or libraries associated with the text recognition may be local to the computing device 110 or located on one of the networked computers. Also in this embodiment, if the digital ink injected by the user does not overlap any text input area, the touch script code automatically fades out the injected digital ink after the predetermined time threshold.

Although in the embodiments described above, a web browser with a touch input addon/plug-in is used, in an alternative embodiment, the touch input functionalities may be directly implemented by the web browser. In yet an alternative embodiment, bookmarklets may be used to implement the touch script code. A bookmarklet is a bookmark that comprises script code. The bookmarklet can be added to the bookmark menu or bookmark toolbar manually by the user, or automatically by an installation application. However, the user has to select the bookmarklet, from a bookmark menu or toolbar for example, to execute the touch script code, thereby facilitating touch functionality. In yet an alternative embodiment, web developers can include the touch script code in their webpages so there is no need for anything different at the web browser. In some other embodiments, the software application may take other forms, such as for example, a desktop or a mobile application using web technologies.

In the above description, specific reference is made to a web browser and webpages. The invention, however, can be used with other types of applications. Generally speaking, the touch script code can be applied to any suitable markup language document that is rendered by a corresponding application to display a user interface in an application window.

In above description, the software program may comprise program modules including routines, object components, data structures, and the like, and may be embodied as computer readable program code stored on a non-transitory computer readable medium. The computer readable medium is any data storage device that can store data. Examples of computer readable media include for example read-only memory, random-access memory, CD-ROMs, magnetic tape, USB keys, flash drives and optical data storage devices. The computer readable program code may also be distributed over a network including coupled computer systems so that the computer readable program code is stored and executed in a distributed fashion. Yet further, additional software may be provided to perform some of the functionality of the touch script code, depending on the implementation.

Although in embodiments described above, the IWB is described as comprising machine vision to register pointer input, those skilled in the art will appreciate that other interactive boards employing other machine vision configurations, analog resistive, electromagnetic, capacitive, acoustic or other technologies to register input may be employed. Further, machine vision different to that described above may also be used.

For example, products and touch systems may be employed such as for example: LCD screens with camera based touch detection (for example SMART Board™ Interactive Display—model 8070i); projector based IWB employing analog resistive detection (for example SMART Board™ IWB Model 640); projector based IWB employing a surface acoustic wave (WAV); projector based IWB employing capacitive touch detection; projector based IWB employing camera based detection (for example SMART Board™ model SBX885ix); table (for example SMART Table™— such as that described in U.S. Pat. Application Publication No. 2011/069019 assigned to SMART Technologies ULC of Calgary, the entire contents of which are incorporated herein by reference); slate computers (for example SMART Slate™ Wireless Slate Model WS200); podium-like products (for example SMART Podium™ Interactive Pen Display) adapted to detect passive touch (for example fingers, pointer, etc,—in addition to or instead of active pens); all of which are provided by SMART Technologies ULC of Calgary, Alberta, Canada.

Other types of products that utilize touch interfaces such as for example tablets, smart-phones with capacitive touch surfaces, flat panels having touch screens, IWBs, a track pad, and the like may also be employed.

Although embodiments have been described above with reference to the accompanying drawings, those of skill in the art will appreciate that variations and modifications may be made without departing from the scope thereof as defined by the appended claims.

What is claimed is:

1. A method for determining the location of a touch input in an application displayed in an application window on an interactive surface of a display device, the application window comprising a canvas configured to display at least a portion of a user interface; the method comprising:

determining a first location of the touch input associated with a first coordinate space, the first coordinate space being associated with the interactive surface;

using the touch input to emulate a mouse event;

injecting the mouse event into the application window;

receiving a second location of the touch input associated with a second coordinate space from the application in response to the injected emulated mouse event;

the second coordinate space being associated with the user interface;

calculating at least one offset parameter correlating the first coordinate space with the second coordinate space; and while the first coordinate space does not change with respect the second coordinate space, using the at least one offset parameter to determine the location of subsequent touch inputs based on corresponding locations associated with the first coordinate space.

2. The method of claim 1, wherein the at least one offset parameter is recalculated when the user interface is loaded into a corresponding application.

3. The method of claim 1, wherein the at least one offset parameter is recalculated when the application window is moved.

4. The method of claim 1, wherein the at least one offset parameter is recalculated when the canvas moves or changes size.

5. The method of claim 1, wherein components of the application window are changed.

6. The method of claim 1, wherein the at least one offset parameter is recalculated when the application window is resized.

7. The method of claim 1, wherein the at least one offset parameter is recalculated when the user interface is panned to display a different portion on the canvas.

8. The method of claim 1, wherein the touch input includes a plurality of other parameters in addition to location.

9. The method of claim 8, wherein the plurality of other parameters includes a pointer colour.

10. The method of claim 8, wherein the plurality of other parameters includes a pointer type.

11. The method of claim 10, wherein the touch input is used for injecting user commands or digital ink, depending on the pointer type.

12. The method of claim 11, comprising the further steps of:

processing the digital ink to determine if it overlaps a user input area;

converting the digital ink to text; and populating the overlapped user input area with the text.

13. The method of claim 12, comprising the further step of removing the digital ink.

14. The method of claim 1, wherein the user interface is a webpage.

15. The method of claim 14, wherein the at least one offset parameter is recalculated when the user interface is loaded into a web browser.

16. A non-transitory computer readable medium having stored thereon instructions for determining the location of a touch input in an application displayed in an application window on an interactive surface of a display device, the application window comprising a canvas configured to display at least a portion of a user interface, the instructions, when executed by a processor, cause the processor to implement the steps of:

determining a first location of the touch input associated with a first coordinate space, the first coordinate space being associated with the interactive surface;

using the touch input to emulate a mouse event;

injecting the mouse event into the application window;

receiving a second location of the touch input associated with a second coordinate space from the application in response to the injected emulated mouse event;

the second coordinate space being associated with the user interface;

calculating at least one offset parameter correlating the first coordinate space with the second coordinate space; and while the first coordinate space does not change with respect the second coordinate space, using the at least one offset parameter to determine the location of subsequent touch inputs based on corresponding locations associated with the first coordinate space.

17. The non-transitory computer readable medium of claim 16, wherein the at least one offset parameter is recalculated when the user interface is loaded into a corresponding application.

18. The non-transitory computer readable medium of claim 16, wherein the at least one offset parameter is recalculated when the application window is moved.

19. The non-transitory computer readable medium of claim 16, wherein the at least one offset parameter is recalculated when the canvas moves or changes size.

20. The non-transitory computer readable medium of claim 16, wherein the at least one offset parameter is recalculated when the application window is resized.

21. The non-transitory computer readable medium of claim 16, wherein the at least one offset parameter is recalculated when the user interface is panned to display a different portion on the canvas.

22. The non-transitory computer readable medium of claim 16, wherein the touch input includes a plurality of other parameters in addition to location.

23. The non-transitory computer readable medium of claim 22, wherein the plurality of other parameters includes a pointer type.

24. The non-transitory computer readable medium of claim 23, wherein the touch input is used for injecting user commands or digital ink, depending on the pointer type.

25. The non-transitory computer readable medium of claim 24, comprising further instruction for:

processing the digital ink to determine if it overlaps a user input area;

converting the digital ink to text; and populating the overlapped user input area with the text.

26. The non-transitory computer readable medium of claim 25, comprising further instruction for removing the digital ink.

27. The non-transitory computer readable medium of claim 16, wherein the user interface is a webpage.

28. The non-transitory computer readable medium of claim 27, wherein the at least one offset parameter is recalculated when the user interface is loaded into a web browser.

29. The computer readable medium of claim 28, wherein the instructions are injected into the webpage using a bookmarklet.

30. The computer readable medium of claim 16, wherein the instructions are automatically injected into a markup language document used to generate the user interface.

31. An interactive processing system comprising a processor and a non-transitory computer readable medium having stored thereon instructions, which when executed cause the processor to implement the steps of:

determining a first location of the touch input associated with a first coordinate space, the first coordinate space being associated with the interactive surface;

using the touch input to emulate a mouse event;

injecting the mouse event into an application window;

receiving a second location of the touch input associated with a second coordinate space from an application associated with the application window in response to the injected emulated mouse event; the second coordinate space being associated with the user interface;

calculating at least one offset parameter correlating the first coordinate space with the second coordinate space; and     while the first coordinate space does not change with respect the second coordinate space, using the at least one offset parameter to determine the location of subsequent touch inputs based on corresponding locations associated with the first coordinate space.

32. The interactive processing system of claim 31, wherein the instructions are automatically injected into a markup language document used to generate the user interface.

33. The interactive processing system of claim 31, wherein the user interface is a webpage, the at least one offset parameter is recalculated when the user interface is loaded into a web browser, and the instructions are injected into the webpage using a bookmarklet.

\* \* \* \* \*